US 8,128,124 B2

(12) United States Patent
Abe

(10) Patent No.: US 8,128,124 B2
(45) Date of Patent: Mar. 6, 2012

(54) AIRBAG CUSHION AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 210 days.

(21) Appl. No.: 12/733,044

(22) PCT Filed: May 29, 2008

(86) PCT No.: PCT/JP2008/059877
§ 371 (c)(1),
(2), (4) Date: Feb. 4, 2010

(87) PCT Pub. No.: WO2009/019926
PCT Pub. Date: Feb. 12, 2009

(65) Prior Publication Data
US 2010/0140908 A1     Jun. 10, 2010

(30) Foreign Application Priority Data
Aug. 9, 2007 (JP) .................................. 2007-208220

(51) Int. Cl.
*B60R 21/239* (2006.01)
*B60R 21/203* (2006.01)
*B60R 21/205* (2006.01)
(52) U.S. Cl. ...... 280/739; 280/731; 280/732; 280/743.1
(58) Field of Classification Search .................. 280/739, 280/731, 732, 730.2, 728.2, 729, 743.1, 743.2
See application file for complete search history.

(56) References Cited

U.S. PATENT DOCUMENTS

| 6,783,151 | B2 * | 8/2004 | Rasch et al. ................. 280/729 |
| 6,832,778 | B2 * | 12/2004 | Pinsenschaum et al. ..... 280/739 |
| 7,497,467 | B2 * | 3/2009 | Chida et al. .................. 280/739 |
| 7,607,690 | B2 * | 10/2009 | Abe et al. ....................... 280/739 |
| 2003/0020266 | A1 * | 1/2003 | Vendely et al. .............. 280/739 |
| 2005/0098991 | A1 | 5/2005 | Nagai et al. |
| 2005/0225065 | A1 * | 10/2005 | Fujll ........................ 280/743.2 |

(Continued)

FOREIGN PATENT DOCUMENTS
DE        200 03 500 U1     8/2000
(Continued)

*Primary Examiner* — Ruth Ilan
*Assistant Examiner* — Keith Frisby
(74) *Attorney, Agent, or Firm* — Manabu Kanesaka

(57) ABSTRACT

There is provided an airbag cushion which is configured to allow the joint between a distal end portion of a lid member and the airbag cushion by a separable joint member to be released easily and rapidly as a whole, and is able to be inflatable rapidly and substantially uniformly as a whole, and an airbag apparatus having the airbag cushion. A rear panel 14 of an airbag cushion 10 is provided with a vent hole 18 which communicates the interior and the exterior of the airbag cushion 10, and the vent hole 18 is covered with a lid member 60 from the inside of the airbag cushion 10. A distal end portion of the lid member 60 and portions of the front panel 12 and the rear panel 14 of the airbag cushion 10 overlapped with the distal end portion of the lid member 60 are releasably joined by a tear seam 70. The tear seam 70 is broken in 10 to 30 mS after having activated an inflator 36, and started with the inflation of the airbag cushion 10, and the joint among the front panel 12, the rear panel 14 and the distal end portion of the lid member 60 is released.

12 Claims, 10 Drawing Sheets

U.S. PATENT DOCUMENTS

2006/0192370 A1 * 8/2006 Abe et al. ................ 280/735

FOREIGN PATENT DOCUMENTS

| | | |
|---|---|---|
| JP | H06-234344 | 8/1994 |
| JP | H06-286568 | 10/1994 |
| JP | H08-119052 | 5/1996 |
| JP | H10-071923 | 3/1998 |
| JP | 2000-016228 | 1/2000 |
| JP | 2004314739 A * | 11/2004 |
| JP | 2005-170206 | 6/2005 |
| JP | 2005-193881 | 7/2005 |
| JP | 2005-199987 | 7/2005 |
| JP | 2005-247118 | 9/2005 |
| JP | 2006-224747 | 8/2006 |
| JP | 2006-224748 | 8/2006 |
| JP | 2006-264662 | 10/2006 |
| JP | 2006347354 A * | 12/2006 |
| JP | 2007-030616 | 2/2007 |
| WO | WO 97/46425 | 12/1997 |
| WO | WO 03/097407 | 11/2003 |

* cited by examiner

AIRBAG CUSHION AND AIRBAG APPARATUS

TECHNICAL FIELD

The present invention relates to an airbag cushion including a vent hole for allowing an occupant to be received softly by the airbag cushion by flowing out gas from the interior of the airbag cushion to the exterior of the airbag cushion, and a lid member configured to cover the vent hole from the inside of the airbag cushion for restraining a flow out of the gas from the vent hole. The present invention also relates to an airbag apparatus having the airbag cushion.

BACKGROUND ART

Providing a vent hole on an airbag cushion and allowing gas to flow out from the interior of the airbag cushion through the vent hole when a vehicle occupant or the like plows into the inflated airbag cushion to receive and constrain the vehicle occupant or the like softly by the airbag cushion is publicly known.

In Japanese Unexamined Patent Application Publication No. 2005-199987, an airbag cushion in which the vent hole is covered with the lid member from the inside of the airbag cushion is described. In the same publication, a proximal end portion of the lid member on the side of the inflator, that is, on the side of the center of the airbag cushion with respect to the vent hole is inseparably joined to the airbag cushion. Also, a distal end portion of the lid member on the opposite side from the inflator with the intermediary of the vent hole, that is, on the side of the outer periphery of the airbag cushion is placed between a front surface, that is, an occupant-faced surface and a rear surface of the airbag cushion at an outer peripheral portion of the airbag cushion and these members are releasably sutured by a sewing yarn which is broken when the interior of the airbag cushion reaches or exceeds a predetermined pressure, so-called a tear seam integrally.

In the Patent Application Publication described above, the outer peripheral portions of the front surface and the rear surface of the airbag cushion are sutured by the teat seam over the entire periphery of the airbag cushion.

In the airbag cushion of the Patent Application Publication described above, in an initial stage of inflation of the airbag cushion by gas from the inflator, the joint among the front surface and the rear surface and the lid member of the airbag cushion by the tear seam is not released, so that the lid member assumes a state of being overlapped in the vent hole. Accordingly, the flow out of the gas from the vent hole is restrained and the interior of the airbag cushion is rapidly brought into a high pressure, whereby the airbag cushion is rapidly inflated.

Then, when the pressure in the interior of the airbag cushion exceeds a predetermined pressure, the tear seam is broken, the front surface and the rear surface of the airbag cushion are moved apart from each other, and the joint between them and the lid member is released, whereby the lid member is pushed out from the airbag cushion through the vent hole by the gas pressure in the interior of the airbag cushion. Accordingly, the vent hole is opened, and when a vehicle occupant is brought into contact with the inflated airbag cushion, the gas is flowed out from the interior of the airbag cushion through the vent hole, so that the vehicle occupant is softly received by the airbag cushion. Patent Document 1: Japanese Unexamined Patent Application Publication No. 2005-199987

According to the airbag cushion in the Japanese Unexamined Patent Application Publication No. 2005-199987 described above, the outer peripheral portions of the front surface and the rear surface of the airbag cushion are sutured over the entire periphery by the tear seam. Therefore, it takes time until the entire tear seam is broken.

In addition, when a portion of the tear seam suturing the front surface, the rear surface and a distal end portion of the lid member is broken at a timing earlier than other portions, the vent hole is opened and gas is flowed out from the airbag cushion before the entire tear seam is broken. In this case, the breakage of the tear seam may be delayed, or the tear seam remains partly unbroken and the entire airbag cushion can hardly be inflated uniformly.

DISCLOSURE OF PRESENT INVENTION

It is an object of the present invention to provide an airbag cushion which is configured to allow the joint between a distal end portion of a lid member and the airbag cushion by a separable joint member to be released easily and rapidly as a whole, and is able to be inflatable rapidly and substantially uniformly as a whole, and an airbag apparatus having the airbag cushion.

An airbag cushion according to a first mode of the present invention is an airbag cushion inflated by gas from an inflator including: a vent hole; a lid member arranged inside the airbag cushion for covering the vent hole, in which a proximal end portion of the lid member on the side of the inflator with respect to the vent hole is inseparably joined to the airbag cushion, and a distal end portion thereof on the opposite side from the inflator with the intermediary of the vent hole is separably joined to the airbag cushion by a separable joint member, the joint by the separable joint member is released and the lid member is allowed to be pushed out from the airbag cushion through the vent hole when the interior of the airbag cushion reaches or exceeds a predetermined pressure, and the separable joint member is provided only on an overlapped portion between the lid member and the airbag cushion.

In the first mode, the airbag cushion according to a second mode is characterized in that the distal end portion of the lid member is placed between opposed surfaces of the airbag cushion and the distal end portion and the opposed surfaces of the airbag cushion are joined by the separable joint member in a state in which the lid member covers the vent hole.

In the first or second mode, the airbag cushion according to a third mode is characterized in that the separable joint member is formed of a sewing yarn configured to be broken when the internal pressure of the airbag cushion reaches or exceeds the predetermined pressure.

In the third mode, the airbag cushion according to a fourth mode is characterized in that the sewing yarn is formed of a synthetic fiber yarn having a fineness of 420 to 1400 dtex.

In the third or fourth mode, the airbag cushion according to a fifth mode is characterized in that a suture pitch of the sewing yarn is from 4 to 8 mm.

In any one of the third to fifth modes, the airbag cushion according to a sixth mode is characterized in that a seam of the sewing yarn extends in the direction intersecting the direction connecting the inflator and the vent hole, and the length of extension of the seam is from 10 to 100 mm.

In any one of the first to sixth modes, the airbag cushion according to a seventh mode is characterized in that the joint by the separable joint member is released in 10 to 30 milliseconds and the distal end portion of the lid member is separated from the airbag cushion from a moment when the inflator is activated.

In any one of the first to seventh modes, the airbag cushion according to an eighth mode is characterized in that an insertion portion of the lid member is provided on an inner side surface of the airbag cushion on the opposite side from the inflator with the intermediary of the vent hole, and the distal end portion of the lid member is inserted into the insertion portion.

An airbag apparatus according to a ninth mode includes the airbag cushion according to any one of the first to eighth modes and the inflator configured to supply gas to the airbag cushion.

In the ninth mode, the airbag apparatus according to a tenth mode is characterized in that the inflator is installed so as to eject gas toward the vent hole.

DETAILED DESCRIPTION

Figure 1:
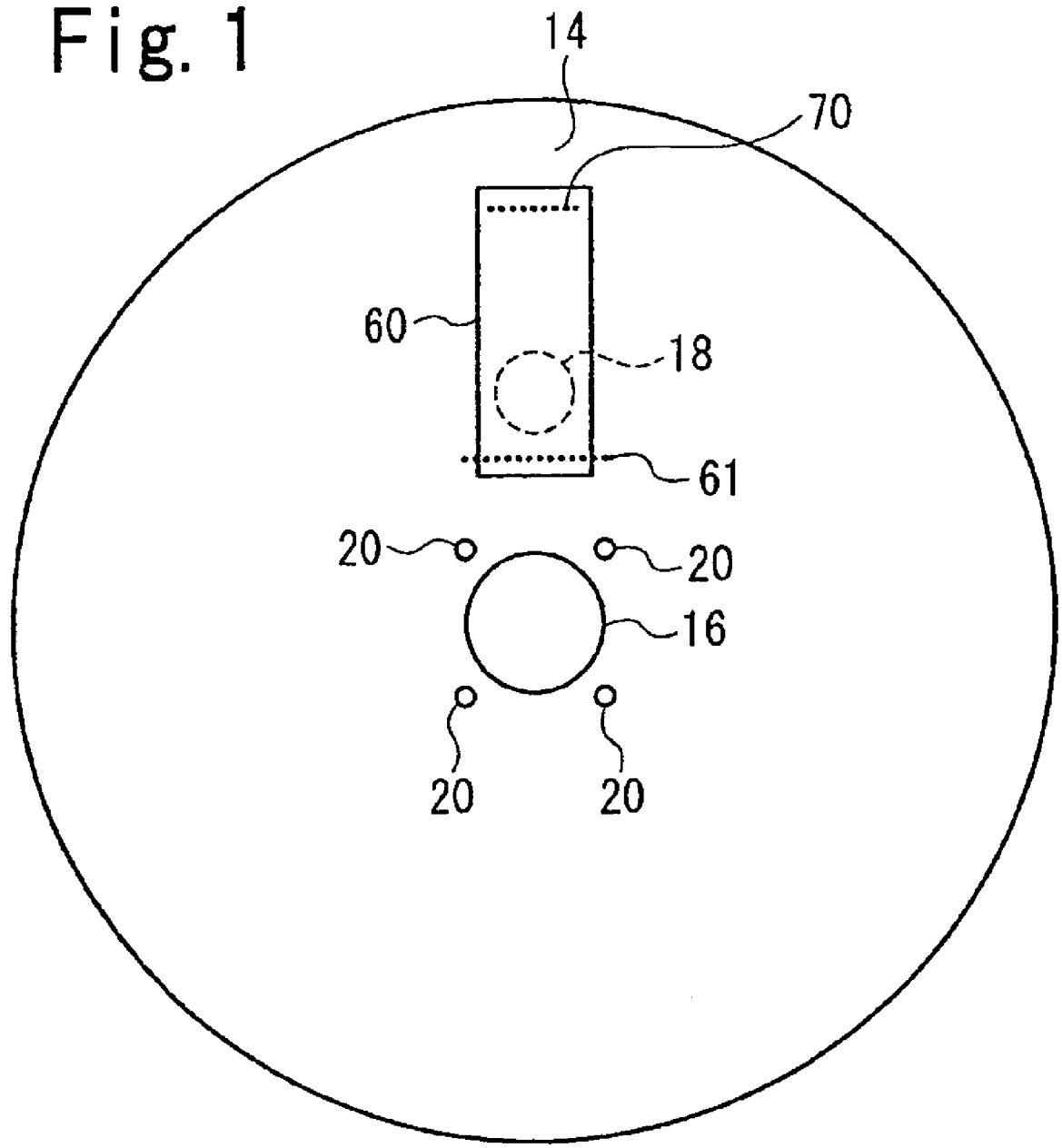
FIG. 1 is a plan view of a rear panel of an airbag cushion according to an embodiment.

According to the airbag cushion in the first mode and the airbag apparatus in the ninth mode, since the separable joint member which releasably joins the lid member and the airbag cushion is provided only on a portion where these members are overlapped, and hence the time required for releasing the joint by the separable joint member may be shorter than the case of the airbag cushion disclosed in above-described Japanese Unexamined Patent Application Publication No. 2005-199987 in which the front surface and the rear surface are joined by the tear seam over the entire periphery.

Also, since a portion other than the overlapped portion with respect to the lid member is not joined by the separable joint member, the airbag cushion can be inflated quickly and substantially uniformly as a whole.

According to the second mode, since the opposed surfaces of the airbag cushion are joined by the separable joint member at the overlapped portion with respect to the respective lid members thereof, the movement of the opposed surfaces of the airbag cushion at this portion away from each other is retrained, so that the internal pressure of the airbag cushion is quickly increased by gas from the inflator.

Also, as described in the third mode, in the present invention, it is simple to use the sewing yarn which is broken when the internal pressure of the airbag cushion reaches or exceeds the predetermined pressure, that is, so-called a tear seam as the separable joint member.

In this case, as described in the fourth mode, the synthetic fiber yarn having a fineness of 420 to 1400 dtex is preferably used as the sewing yarn.

As described in the fifth mode, the suture pitch of the sewing yarn is preferably 4 to 8 mm.

As described in the sixth mode, in the present invention, preferably, the seam of the sewing yarn extends in the direction intersecting the direction connecting the inflator and the vent hole and the length of extension of the seam is from 10 to 100 mm.

According to the present invention, as described in the seventh mode preferably, the joint by the separable joint member is released in 10 to 30 milliseconds (mS) and the distal end portion of the lid member is separated from the airbag cushion from a moment when the inflator is activated. In this configuration, for example, the vent holes are opened and the occupant is softly received even when the airbag cushion is inflated when the vehicle occupant is positioned in front of a predetermined position to be seated, that is, at an out-of-position, and hence the occupant comes into contact with the airbag cushion in a relatively early stage from the start of inflation of the airbag cushion.

According to the eighth mode, since the distal end portion of the lid member is inserted through the insertion portion, the lid member is prevented from being displaced from the vent hole or being curled up even after the joint between the distal end portion and the airbag cushion by the separable joint member is released, so that the closability of the vent hole is improved.

In the present invention, as described in the tenth mode, preferably, the inflator is installed in such a manner that the direction of ejection of the gas from the inflator is directed to the vent hole. In this configuration, the lid member remains closing the vent hole by being pushed against the airbag cushion by the ejected gas from the inflator while the internal pressure of the airbag cushion is not increased to a level which causes the lid member to be pushed out from the airbag cushion through the vent hole after the airbag cushion has been inflated and the joint between the distal end portion of the lid member and the airbag cushion by the separable joint member is released. Accordingly, the internal pressure of the airbag cushion is quickly increased.

In the present invention, a proximal end portion of the lid member on the side of the inflator with respect to the vent hole is inseparably joined to the airbag cushion. In other words, the lid member is inseparably joined to the airbag cushion on the upstream side in the direction of ejection of the gas from the inflator. Accordingly, the lid member is prevented from being curled up from the vent hole by the ejected gas pressure from the inflator.

Referring now to the drawings, embodiments of the present invention will be described.

Figure 2:
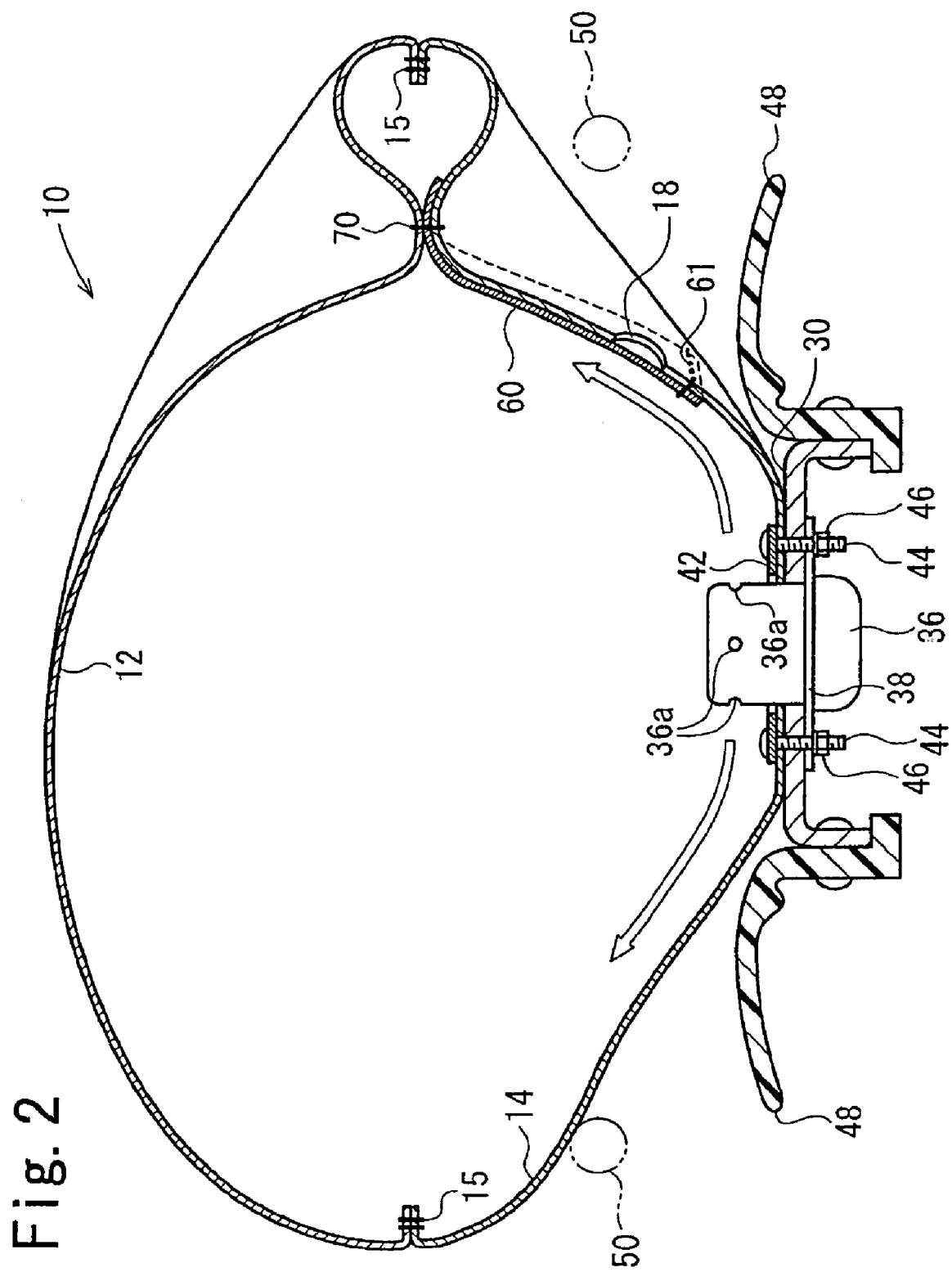
FIG. 2 is a cross-sectional view of the airbag cushion shown in FIG. 1 and an airbag apparatus having the airbag cushion when the airbag cushion is inflated.
Figure 3:
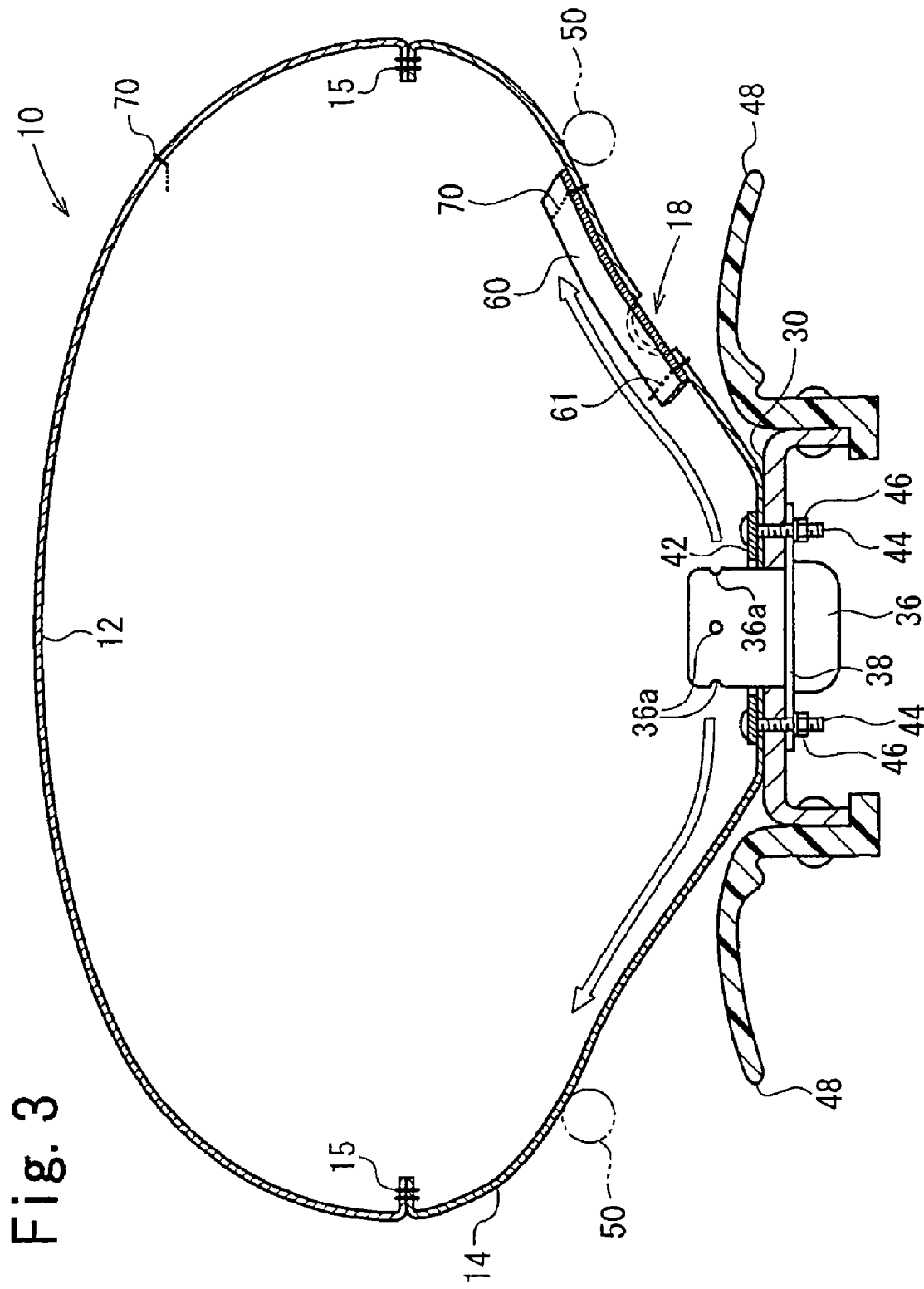
FIG. 3 is a cross-sectional view of the airbag cushion shown in FIG. 1 and the airbag apparatus having the airbag cushion when the airbag cushion is inflated.
Figure 4:
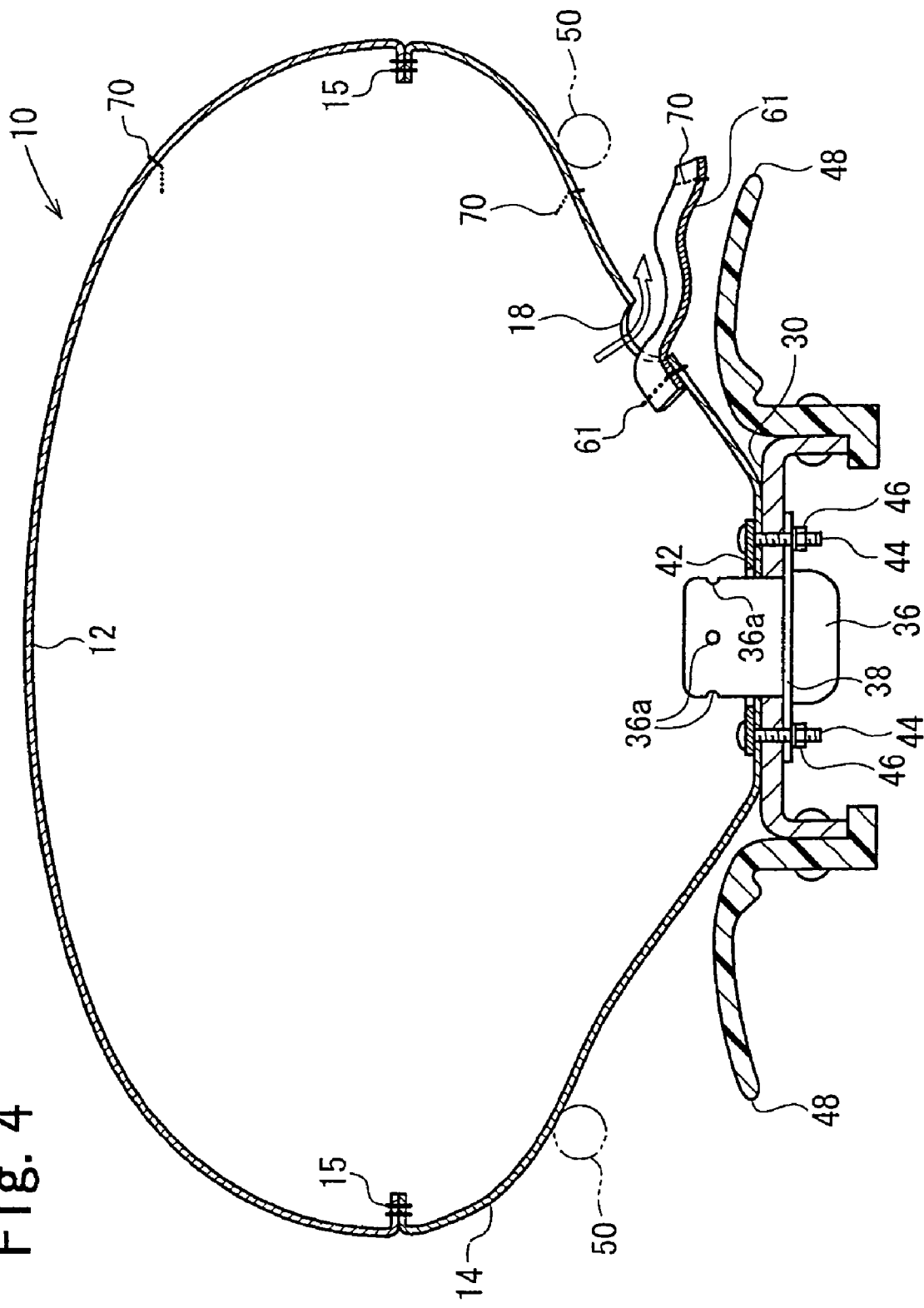
FIG. 4 is a cross-sectional view of the airbag cushion shown in FIG. 1 and the airbag apparatus having the airbag cushion when the airbag cushion is inflated.
Figure 5:
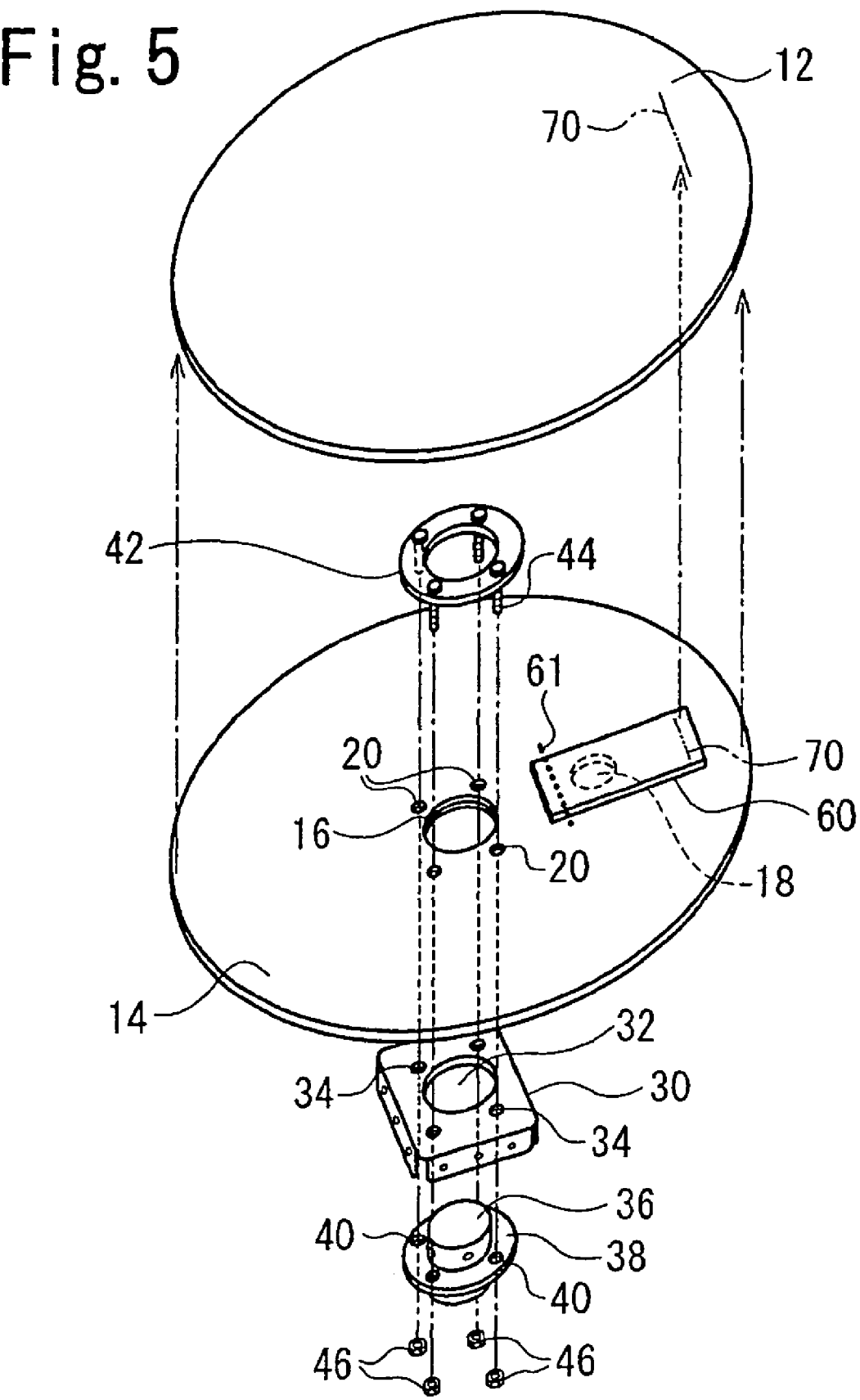
FIG. 5 is an exploded perspective view of the airbag cushion shown in FIG. 1 and the airbag apparatus.
Figure 6:
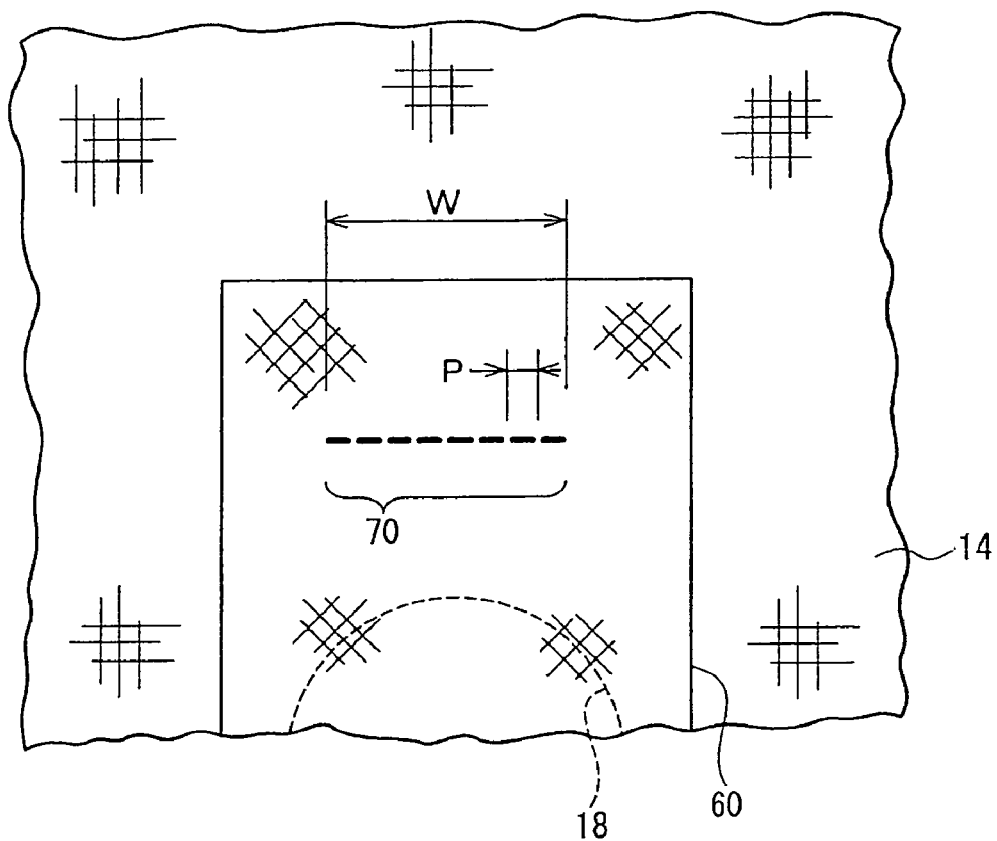
FIG. 6 is a plan view of a portion near a sutured portion between a distal end portion of a lid member and a rear panel by a tear seam as a separable joint member of the airbag cushion shown in FIG. 1.

FIG. 1 is plan a view of a rear panel of an airbag cushion according to an embodiment. FIGS. 2 to 4 are cross-sectional views of the airbag cushion and an airbag apparatus having the airbag cushion when the airbag cushion is inflated. FIG. 5 is an exploded perspective view of the airbag cushion and the airbag apparatus. FIG. 6 is a plan view of a portion near a sutured portion between a distal end portion of a lid member and the rear panel by a tear seam as a separable joint member of the airbag cushion. FIG. 1 and FIG. 6 are drawings of the rear panel viewed from the inside of the airbag cushion. FIG. 2 shows a stage before the tear seam is broken, FIG. 3 shows a stage before the lid member is pushed out from the airbag cushion after the tear seam is broken, and FIG. 4 shows a stage after the lid member is pushed out from the airbag cushion.

In this embodiment, an airbag cushion 10 is a driver's airbag cushion of a vehicle.

The airbag cushion 10 includes a front panel 12 which constitutes an occupant-faced surface, a rear panel 14 which constitutes an opposite surface of the occupant-faced surface on the opposite side from the occupant-faced surface, a vent hole 18 which communicates the interior and the exterior of the airbag cushion 10, and a lid member 60 or the like configured to cover the vent hole 18 from the interior of the airbag cushion 10.

The front panel 12 and the rear panel 14 are formed respectively of circular woven cloths. The front panel 12 and the rear panel 14 have substantially the same diameter, and are formed into a bag shape by suturing outer peripheral edge portions by a seam 15. The seam 15 is formed into an annular shape around the outer peripheries of the front panel 12 and the rear panel 14. In this embodiment, the seam 15 is formed of a sewing yarn or the like, but is not limited thereto. The seam 15 is a high-strength seam which is not broken even when the internal pressure of the airbag cushion 10 reaches or exceeds the predetermined pressure, and inseparably joins the outer peripheral edge portions of the front panel 12 and the rear panel 14 with each other.

The rear panel 14 is provided with an inflator opening 16 and the vent hole 18. The inflator opening 16 is arranged at a center of the rear panel 14. Bolt insertion holes 20 are provided around the inflator opening 16.

As shown in FIG. 1, the vent hole 18 is arranged above the inflator opening 16 in this embodiment (the vertical direction in this case matches the vertical direction when a steering wheel 50 described later is at a steering position when the vehicle travels straight forward, it is applied to the description given below as well). The arrangement of the vent hole 18 is not limited thereto.

As shown in FIG. 1, the lid member 60 is formed of a woven cloth in a substantially rectangular shape having a length and a width which allow coverage of the entire vent hole 18 in this embodiment. The lid member 60 is arranged so as to extend across the vent hole 18 so as to align the longitudinal direction with the direction of radius of the rear panel 14. An end portion of the lid member 60 on the side of the center of the rear panel 14, that is, a proximal end portion thereof is stitched to the rear panel 14 by a seam 61 on the side of the inflator opening 16 with respect to the vent hole 18. The seam 61 is formed of a sewing yarn, but is not limited thereto. The seam 61 is a high-strength seam which is not broken even when the internal pressure of the airbag cushion 10 reaches or exceeds a predetermined pressure, and inseparably joins the proximal end portion of the lid member 60 and the rear panel 14 with each other.

In the airbag cushion 10, as shown in FIG. 2, a distal end portion of the lid member 60 is placed between the front panel 12 and the rear panel 14 in a state in which the lid member 60 is overlapped with the rear panel 14 on an inner side surface of the airbag cushion so as to close the vent hole 18, and these embers are releasably joined integrally by a tear seam 70 as the separable joint member.

The tear seam 70 joins only the overlapped portions of the front panel 12 and the rear panel 14 with the distal end portion of the lid member 60 and, at a portion other than that, the front panel 12 and the rear panel 14 are not joined by the tear seam 70.

The tear seam 70 is formed of a low-strength sewing yarn which is broken when the internal pressure of the airbag cushion 10 reaches or exceeds the predetermined pressure. In the present invention, the sewing yarn which constitutes the tear seam 70 is preferably formed of a synthetic fiber yarn having a fineness of 420 to 1400 dtex, specifically, of 940 to 1400 dtex. Also, an upper yarn and a lower yarn which constitute the tear seam 70 are preferably fiber yarns of the same type. In addition, as shown in FIG. 6, the suture pitch P of the tear seam 70, that is, intervals of the insertion of a sewing needle at the time of suturing are preferably from 4 to 8 mm, specifically, from 4 to 6 mm.

The material of the tear seam 70 is, preferably, 66 nylon or polyester or the like.

As shown in FIG. 1 and FIG. 6, the tear seam 70, that is, a seam of the sewing yarn is provided so as to extend in the direction substantially orthogonal to the direction of radius of the rear panel 14. In the present invention, an extending length W of the tear seam 70 is preferably from 10 to 100 mm, preferably, from 20 to 50 mm. In this embodiment, a ridge of the tear seam 70 is provided so as to continue by the length W. However, a plurality of ridges of the tear seams 70 each having a shorter length may be provided discontinuously on the same line. In this case, the total of the extending length W of the respective tear seams 70 preferably falls within a range described above. In the present invention, the plurality of ridges of the tear seams 70 may be arranged in parallel.

In the present invention, the fineness and the suture pitch P of the sewing yarn which constitute the tear seam 70 and the extending length W of the tear seam 70 of the airbag cushion 10 are preferably set to values so that the tear seam 70 is broken within 10 to 30 mS, specifically within 15 to 20 mS from a moment when an inflator 36 described later is activated and the airbag cushion 10 starts inflation and the joint among the front panel 12, the rear panel 14 and the distal end portion of the lid member 60 is released.

A retainer 30 for mounting the airbag cushion 10 is provided with an inflator mounting port 32 at a center thereof, and volt insertion holes 34 are provided therearound.

The inflator 36 is a member having a substantially cylindrical shape, and gas ejection ports 36a are provided on a side peripheral surface on the distal end side in the direction of a cylinder axis. The inflator 36 is configured to eject gas from the gas ejection ports 36a in the radial direction. A flange 38 for fixing the inflator is formed to project from a midsection of the inflator 36 in the direction of the cylinder axis on the side peripheral surface thereof on the rear end side of the gas ejection ports 36a. The flange 38 is formed with bolt insertion holes 40. The distal end side of the inflator 36 is fitted to the inflator mounting port 32.

When mounting the airbag cushion 10 to the retainer 30, a peripheral edge portion of the inflator opening 16 of the rear panel 14 is overlapped with a peripheral edge portion of the inflator mounting port 32 of the retainer 30. Then, stud bolts 44 of a holding ring 42 are inserted into the respective bolt insertion holes 20, 34, 40 of the rear panel 14, the retainer 30 and the flange 38, and nuts 46 are tightened on distal ends thereof, so that the rear panel 14 and the inflator 36 are fixed to the retainer 30.

In this embodiment, as shown in FIGS. 2 to 4, the inflator 36 is mounted on the retainer 30 so that at least one of the gas ejection ports 36a is oriented upward. From the gas ejection ports 36a oriented upward, gas is ejected upward, that is, toward the lid member 60.

Thereafter, the airbag cushion 10 is folded, and a module cover 48 is mounted on the retainer 30 so as to cover the folded airbag cushion 10, so that the airbag apparatus is configured. However, the airbag cushion 10 may be folded in advance prior to the mounting of the airbag cushion 10 on the retainer 30.

According to the airbag cushion 10, since the distal end portion of the lid member 60 is joined to the front panel 12 and the rear panel 14 by the tear seam 70, the lid member 60 is prevented from being displaced at a position to close the vent hole 18, for example, when folding the airbag cushion 10, so that the improved workability is achieved in the folding operation.

The airbag apparatus is installed in the steering wheel 50 of a motor vehicle.

In case of collision of the vehicle provided with the airbag apparatus configured as described above, the inflator 36 is activated and gas is ejected into the interior of the airbag cushion 10. The airbag cushion 10 is inflated by the gas to push the module cover 48 to open, and is deployed into a cabin.

As shown in FIG. 2, the lid member 60 is placed between the front panel 12 and the rear panel 14 and is kept in a state of being sutured to them by the tear seam 70 until the internal pressure of the airbag cushion 10 reaches or exceeds the predetermined pressure. Therefore, the lid member 60 is kept in the state of closing the vent hole 18 without being pushed out from the airbag cushion 10 through the vent hole 18 by the gas pressure in the interior of the airbag cushion 10. Accordingly, the flow out of the gas from the airbag cushion 10 through the vent hole 18 is restrained. In addition, since the overlapped portions of the front panel 12 and the rear panel 14 with the distal end portion of the lid member 60 are joined to each other by the tear seam 70, the inflation of the airbag cushion 10 is also restrained in this part. Consequently, the internal pressure of the airbag cushion 10 is rapidly increased.

When the internal pressure of the airbag cushion 10 reaches or exceeds the predetermined pressure, as shown in FIG. 3, the tear seam 70 is broken and the joint among the front panel 12, the rear panel 14 and the distal end portion of the lid member 60 is released. Accordingly, the restraint of inflation of the airbag cushion 10 is released, and the airbag cushion 10 is inflated to a finally inflated state.

In this embodiment, since the gas is ejected from the inflator 36 toward the lid member 60, the lid member 60 is pushed against the rear panel 14 on the side of the inner side surface of the airbag cushion by the pressure of the ejected gas from the inflator 36 and hence the vent hole 18 remains closed even after the tear seam 70 has broken while the internal pressure of the airbag cushion 10 is not increased to a level which causes the lid member 60 to be pushed out from the airbag cushion 10 through the vent hole 18. Accordingly, the internal pressure of the airbag cushion 10 is increased quickly, and the airbag cushion 10 is rapidly inflated.

In this connection, since the side of the lid member 60 on the side of the center of the rear panel 14 with respect to the vent hole 18, that is, the side on the upstream side of the ejected gas flow from the inflator 36 is joined to the rear panel 14, the lid member 60 is prevented from being curled up from the vent hole 18 by the ejected gas pressure.

Then, the lid member 60 is pushed out from the airbag cushion 10 through the vent hole 18 by the gas pressure in the interior of the airbag cushion 10 by the increase in pressure in the interior of the airbag cushion 10 as shown in FIG. 4, so that the vent hole 18 is opened. Consequently, when an occupant is brought into contact with the inflated airbag cushion 10, the gas flows out to the outside of the airbag cushion 10 from the vents 18 and the occupant is softly received by the airbag cushion 10.

According to the airbag cushion 10, the distal end portion of the lid member 60 and the overlapped portion of the front panel 12 and the rear panel 14 with the distal end portion of the lid member 60 are joined to each other by the tear seam 70, the entire portion of the tear seam 70 is broken in a short time from a timing when the interior of the airbag cushion 10 reaches or exceeds the predetermined pressure and the tear seam 70 starts to be broken. Therefore, the joint between the distal end portion of the lid member 60 and the respective panels 12, 14, and the joint between the panels 12, 14 with respect to each other are quickly released.

Also, since a portion other than the overlapped portions of the front panel 12 and the rear panel 14 with respect to the lid member 60 is not joined by the tear seam 70, the airbag cushion 10 is inflated quickly and substantially uniformly as a whole.

Since the airbag cushion 10 is configured in such a manner that the tear seam 70 is broken in 10 to 30 mS from a moment when the operation of the inflator 36 is started, and the distal end portion of the lid member 60, the front panel 12 and the rear panel 14 are separated, the vent hole 18 is opened and the occupant is softly received even when the airbag cushion 10 is inflated when the occupant is positioned in front of a predetermined position to be seated, that is, at an out-of-position, and hence the occupant is brought into contact with the airbag cushion 10 in a relatively early stage from the start of inflation of the airbag cushion 10, for example.

In this embodiment, although there is provided only one vent hole 18, two or more of the vent holes 18 may be provided. When providing two or more of the vent holes 18, the lid member may be provided on every vent holes and, alternatively, there may be a vent hole having no lid member provided thereon, that is, there may be a vent hole which communicates the interior and the exterior of the airbag cushion constantly.

Figure 7:
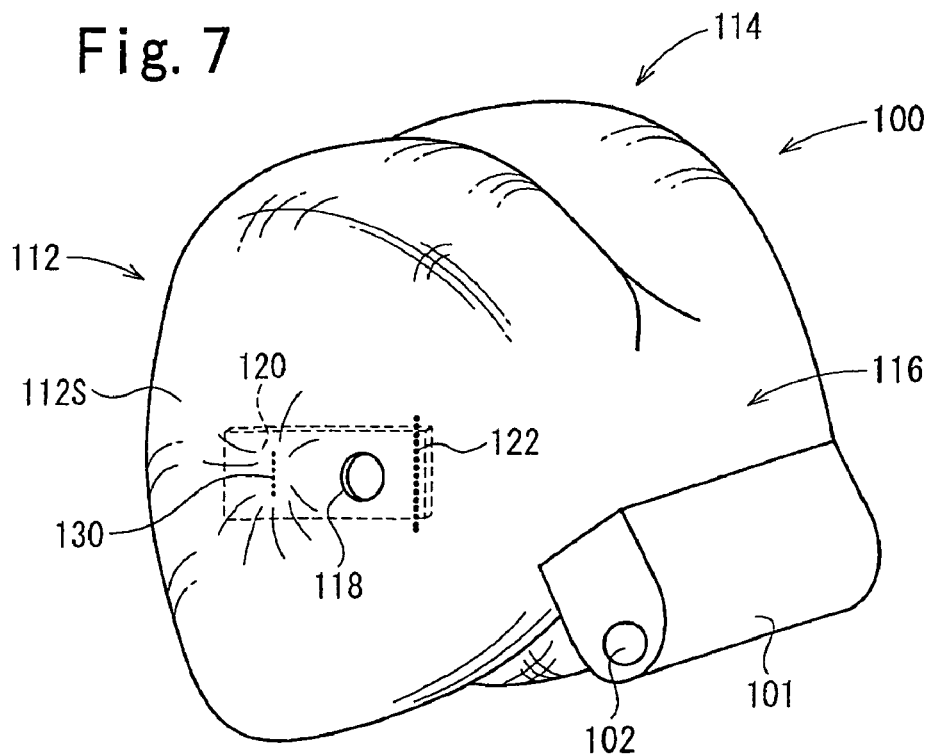
FIG. 7 is a perspective view of an airbag cushion and an airbag apparatus according to another embodiment.
Figure 8:
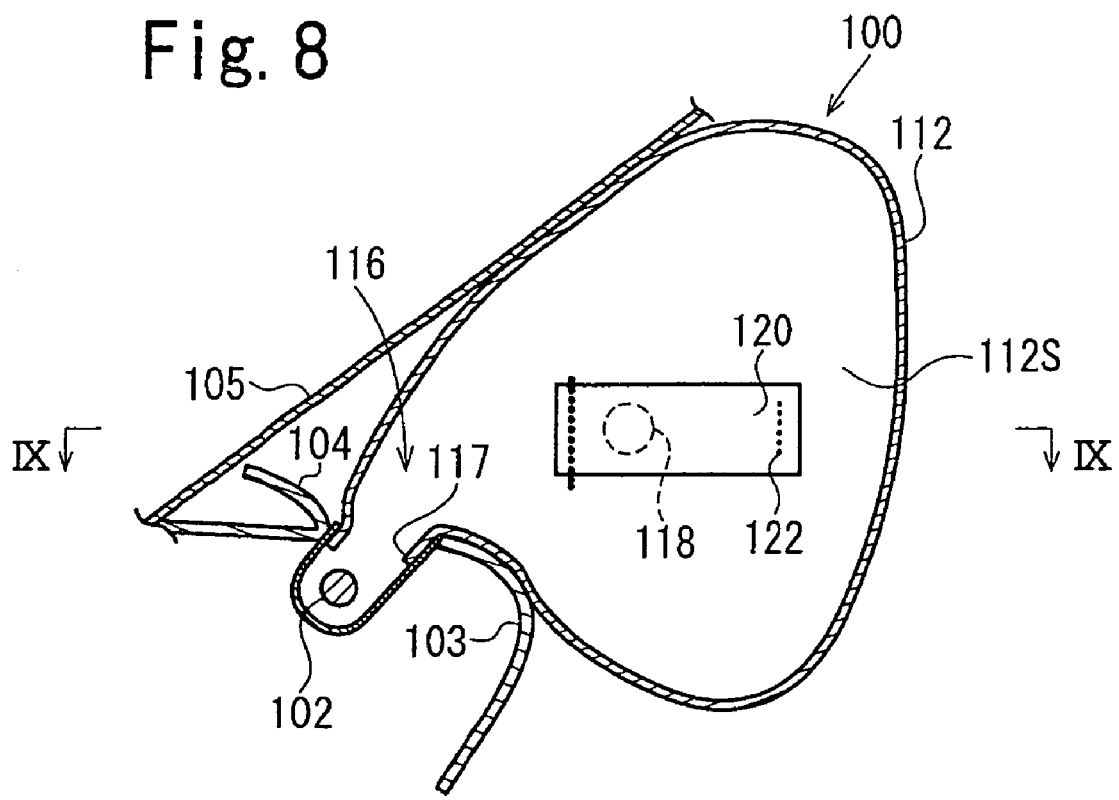
FIG. 8 is a vertical cross-sectional view of the airbag cushion shown in FIG. 7 and the airbag apparatus.
Figure 9:
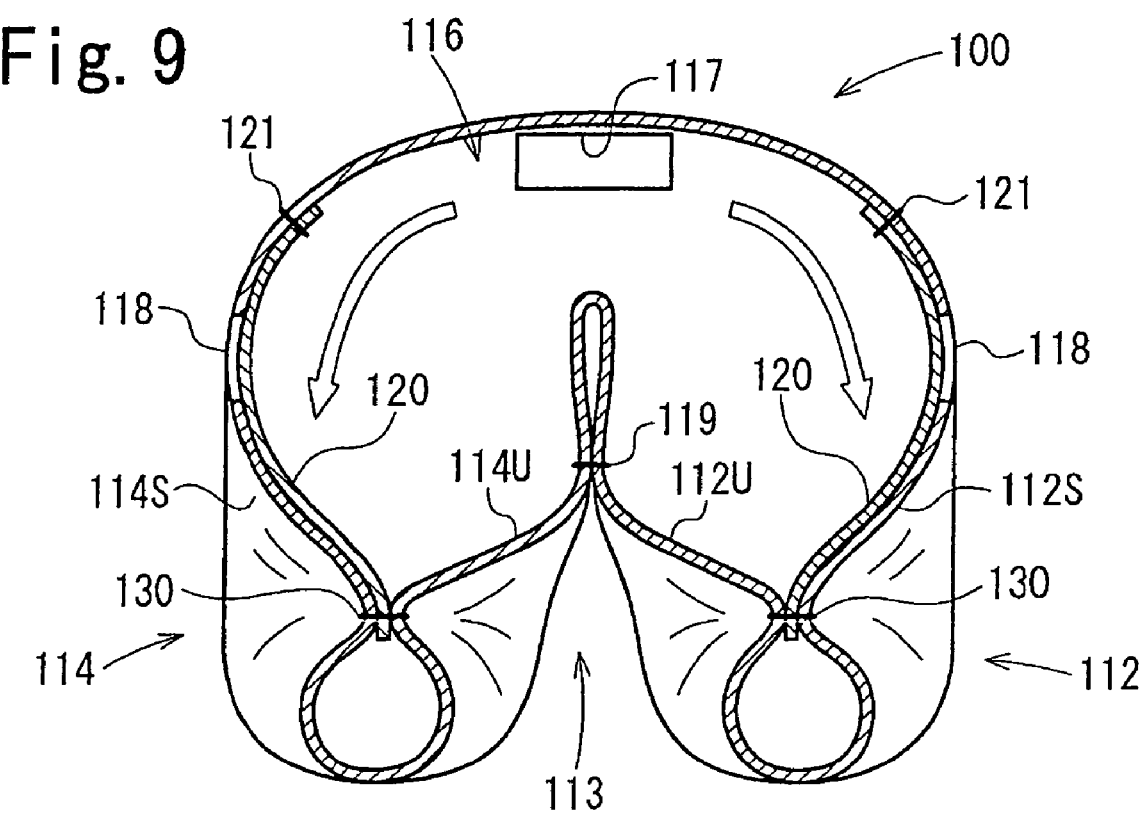
FIG. 9 is a horizontal cross-sectional view of the airbag cushion shown in FIG. 7 in an inflated state.
Figure 10:
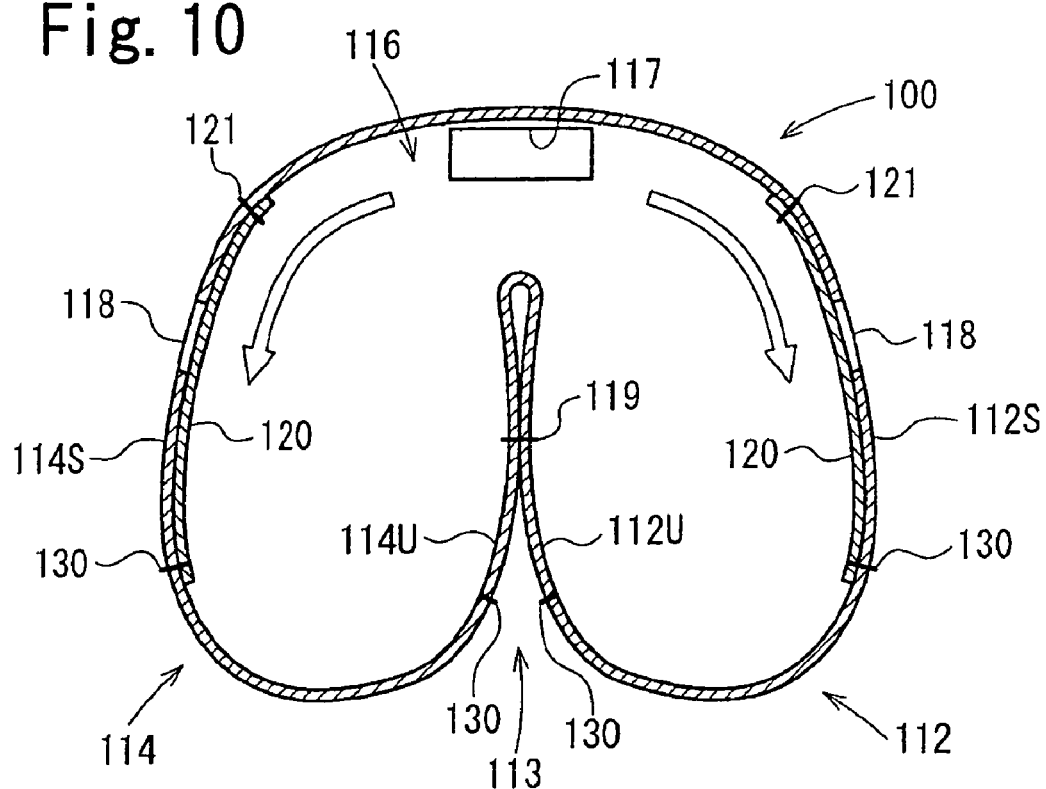
FIG. 10 is a horizontal cross-sectional view of the airbag cushion shown in FIG. 7 in an inflated state.
Figure 11:
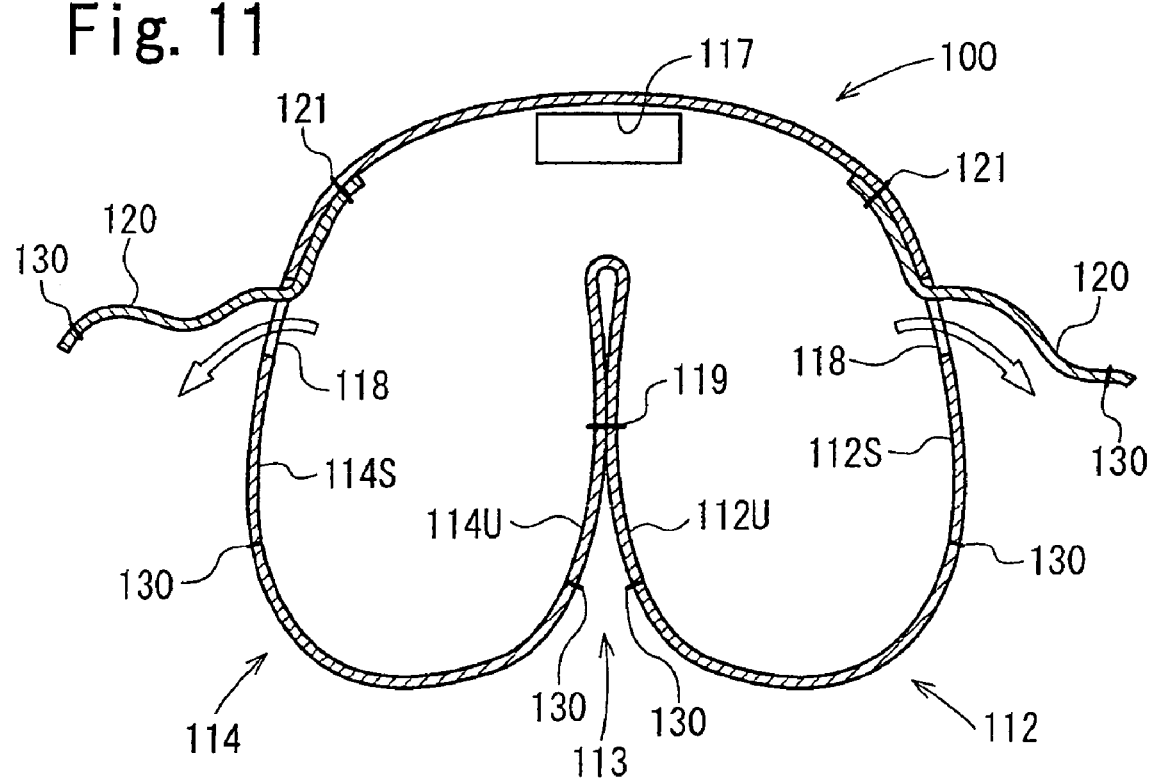
FIG. 11 is a horizontal cross-sectional view of the airbag cushion shown in FIG. 7 in an inflated state.

FIG. 7 is a perspective view of an airbag cushion and an airbag apparatus according to another embodiment, FIG. 8 is a vertical cross-sectional view of the airbag cushion and the airbag apparatus, and FIGS. 9 to 11 are horizontal cross-sectional views at the time when the airbag cushion is inflated, that is, cross-sectional views taken along the line IX-IX in FIG. 8. FIG. 9 shows a stage before the tear seam is broken, FIG. 10 shows a stage before the lid members are pushed out from the airbag cushion after the tear seams are broken, and FIG. 11 shows a stage after the lid members are pushed out from the airbag cushion.

In this embodiment, an airbag cushion 100 is a passenger airbag cushion of a motor vehicle.

The passenger airbag cushion 100 is stored in a container 101 in a folded state, and is inflated by an inflator 102. The passenger airbag cushion 100 is installed in an instrument panel 103. Above the container 101 is covered by a lid 104. Reference numeral 105 designates a windshield.

The passenger airbag cushion 100 includes a right airbag section 112 which is inflated on the right side in front of the occupant, a left airbag section 114 which is inflated on the left side in front of the occupant, and a proximal end chamber 116 communicating proximal end sides of the right airbag section 112 and the left airbag section 114 with each other. A gas introducing port 117 is provided on a bottom surface of the proximal end chamber 116, and the gas introducing port 117 is coupled to the container 101.

When the airbag cushion 100 is inflated, gas is introduced from the gas introducing port 117 into the proximal end chamber 116, and then, the gas is introduced from the proximal end chamber 116 respectively into the right airbag section 112 and the left airbag section 114, so that the right airbag section 112 and the left airbag section 114 are inflated and deployed respectively toward the occupant.

In a state in which the airbag cushion 100 is inflated, a bridge member such as a tie panel is not present between distal end portions of the right airbag section 112 and the left airbag section 114, and a space portion 113 defined between the distal end portions of the both bags 112, 114 on the side of the occupant is opened toward the occupant, that is, downward in FIGS. 9 to 11.

In a state in which the airbag cushion 100 is completely inflated, the distance between an extremity of the right airbag section 112 and an extremity of the left airbag section 114 are preferably from 150 to 450 mm, specifically, from 170 to 430 mm.

Opposed surfaces of the right airbag section 112 and the left airbag section 114, that is, an inside surface 112U of the right airbag section 112 on the side of the left airbag section 114 and an inside surface 114U of the left airbag section 114 on the side of the right airbag section 112 are sutured by a seam 119 between the respective distal end sides and the proximal end sides. In this embodiment, the seam 119 is formed of a sewing yarn or the like, but is not limited thereto. The seam 119 is a high-strength seam which is not broken even when the internal pressure of the airbag cushion 100 reaches or exceeds a predetermined pressure, and inseparably joins the inside surfaces 112U, 114U with each other.

A horizontal distance from the extremities of the right airbag section 112 and the left airbag section 114 to the innermost portion of the space portion 113, that is, to the seam 119 is preferably from 280 to 480 mm, specifically, from 310 to 450 mm.

An outside surface 112S of the right airbag section 112 on the side opposite from the left airbag section 114 and an outside surface 114S of the left airbag section 114 on the side opposite from the right airbag section 112 are respectively provided with the vent holes 118, which respectively communicates the interior and the exterior of the airbag cushion. Also, the vent holes 118 are covered by lid members 120 respectively from the inside of the right airbag section 112 and the inside of the left airbag section 114.

In this embodiment as well, the respective lid members 120 are each formed of a woven cloth in a substantially rectangular shape having a length and a width which allow coverage of the entire vent hole 118. The respective lid members 120 are arranged so as to extend across respective vent holes 118 so as to align the respective longitudinal directions with the direction connecting the occupant side and the opposite side from the occupant, that is, the fore-and-aft direction. Proximal end portions of the respective lid members 120 on the side opposite from the occupant, that is, on the side of the proximal end chamber 116 are sutured to the respective outside surfaces 112S, 114S by a seam 121 on the side of the proximal end chamber 116 with respect to the respective vent holes 118. The seam 121 is formed of a sewing yarn, but is not limited thereto. The seam 121 is a high-strength seam which is not broken even when the internal pressure of the airbag cushion 100 reaches or exceeds the predetermined pressure, and inseparably joins the proximal end portions of the respective lid members 120 and the respective outside surfaces 112S, 114S with each other.

As shown in FIG. 9, in the right airbag section 112, in a state in which the lid member 120 is overlapped with the outside surface 112S of the right airbag section 112 on the side of an inner side surface of the airbag cushion so as to close the vent hole 118, a distal end portion of the lid member 120 is placed between the outside surface 112S and the inside surface 112U of the right airbag section 112 and these members are integrally and releasably joined by a tear seam 130 as the separable joint member. The tear seam 130 sutures only the overlapped portions of the outside surface 112S and the inside surface 112U overlapped with the distal end portions of the lid members 120, and at a portion other than that, the outside surface 112S and the inside surface 112U are not joined by the tear seam 130.

Also, as shown in FIG. 9, in the left airbag section 114, in the state in which the lid member 120 is overlapped with the outside surface 114S of the left airbag section 114 on the side of the inner side surface of the airbag cushion so as to close the vent hole 118, the distal end portion of the lid member 120 is placed between the outside surface 114S and the inside surface 114U of the left airbag section 114 and these members are integrally and releasably joined by the tear seam 130. In the left airbag section 114 as well, the tear seam 130 sutures only the overlapped portions of the outside surface 114S and the inside surface 114U overlapped with the distal end portions of the lid members 120, and at a portion other than that, the outside surface 114S and the inside surface 114U are not joined by the tear seam 130.

The configuration of the tear seam 130 is the same as the tear seam 70 in the embodiment described above.

According to the airbag cushion 100 as well, since the distal end portions of the lid members 120 are joined respectively to the outside surface 112S of the right airbag section 112 and the outside surface 114S of the left airbag section 114, the respective lid members 120 are prevented from being displaced at positions to close the vent holes 118 when folding the airbag cushion 100, so that the improved workability is achieved in the folding operation.

In case of collision of the vehicle provided with the airbag apparatus configured as described above, the inflator 102 is activated and gas is ejected into the interior of the airbag cushion 100. The airbag cushion 10 is inflated by the gas to push the rid 104 to open, and is deployed in the cabin.

In this case, gas from the inflator 102 is introduced from the gas introducing port 117 to the proximal end chamber 116, then the gas is introduced from the proximal end chamber 116 to the right airbag section 112 and the left airbag section 114, respectively. Accordingly, the right airbag section 112 and the left airbag section 114 are inflated and deployed toward the occupant.

As shown in FIG. 9, the lid members 120 are placed between the outside surface 112S and the inside surface 112U of the right airbag section 112, and between the outside surface 114S and the inside surface 114U of the left airbag section 114 respectively and are sutured therewith by the tear seam 130 until the internal pressure of the right airbag section 112 and the left airbag section 114 reaches or exceeds a predetermined pressure.

Therefore, the respective lid members 120 are kept in the state of closing the respective vent holes 118 without being pushed out from the respective airbag cushions 112, 114 through the respective vent holes 118 by the gas pressure in the interior of the respective airbag cushions 112, 114.

Accordingly, the flow out of the gas from the respective airbag cushions 112, 114 through the respective vent holes 118 is restrained. In addition, since the overlapped portions of the outside surfaces 112S, 114S and the inside surfaces 112U, 114U of the respective airbag cushions 112, 114 with respect to the distal end portions of the respective lid members 120 are joined by the respective tear seams 130, the inflation of the respective airbag cushions 112, 114 is also restrained in this part. Consequently, the internal pressures of the respective airbag cushions 112, 114 are rapidly increased.

When the internal pressures of the airbag cushions 112, 114 reach or exceed the predetermined pressure, respectively, as shown in FIG. 10, the respective tear seams 130 are broken, and the joints between the outside surfaces 112S, 114S and the inside surfaces 112U, 114U of the airbag cushions 112, 114 and the distal end portions of the respective lid members 120 are released, respectively. Accordingly, the restraint of inflation of the bags 112, 114 is released, and the bags 112, 114 are inflated to a finally inflated state respectively.

In this embodiment, the respective lid members 120 are pushed against the outside surfaces 112S, 114S of the respective bags 112, 114 by the gas pressure flowing from the proximal end chamber 116 into the respective airbag cushions 112, 114 and hence the respective vent holes 118 remain closed even after the respective tear seams 130 have broken while the internal pressures of the respective bags 112, 114 are not increased to a level which causes the respective lid members 120 to be pushed out from the bags 112, 114 through the respective vent holes 118. Accordingly, the internal pressures of the respective bags 112, 114 are increased quickly, and the respective bags 112, 114 are rapidly inflated.

In this connection, since the respective lid members 120 are joined to the side of the proximal end chamber 116 with respect to the respective vent holes 118, that is, to the upstream side of the gas flow flowing from the proximal end chamber 116 to the respective bags 112, 114 or to the respective outside surfaces 112S, 114S, the respective lid members 120 are prevented from being curled up from the respective vent holes 118 by the flow-in gas pressure.

Then, the respective lid members 120 are pushed out from the respective bags 112, 114 through the respective vent holes 118 by the gas pressure in the interiors of the respective bags 112, 114 by the increase in pressures in the interiors of the respective bags 112, 114 as shown in FIG. 11, so that the respective vent holes 18 are opened. Consequently, when the occupant is brought into contact with the inflated airbag cushion 100, the gas flows out from the respective bags 112, 114 through the respective vent holes 118 and the occupant is softly received.

In a state in which the airbag cushion 100 is inflated completely, the space portion 113 is formed between the distal end portions of the right airbag section 112 and the left airbag section 114, and the space portion 113 is opened toward the occupant. Then, the inflated right airbag section 112 receives a right chest of the occupant, and the inflated left airbag section 114 receives a left chest, and a portion near the rib bones opposes the space portion 113. Therefore, a reaction force applied to the portion near the rib bones when being received by the airbag cushion is small.

According to the airbag cushion 100 as well, since only the overlapped portion of the outside surfaces 112S, 114S and the inside surfaces 112U, 114U of the bags 112, 114 with respect to the distal end portions of the lid members 120 are releasably joined by the tear seam 130 respectively, the entire portion of the respective tear seams 130 are broken in a short time from a timing when the interiors of the respective bags 112, 114 reaches or exceeds the predetermined pressure and the respective tear seams 130 start to be broken. Therefore, the joints between the distal end portions of the respective lid members 120 and the outside surfaces 112S, 114S and the inside surfaces 112U, 114U of the respective bags 112, 114 are quickly released.

Also, since a portion other than the overlapped portion of the outside surfaces 112S, 114S and the inside surfaces 112U, 114U with respect to the respective lid members 120 are not joined by the tear seams 130, the right airbag section 112 and the left airbag section 114 are respectively inflated quickly and substantially uniformly as a whole.

The airbag cushion 100 is also configured in such a manner that the respective tear seams 130 are broken in 10 to 30 mS from a moment when the inflator 102 is activated, and the distal end portions of the respective lid members 120 and the outside surfaces 112S, 114S of the respective bags 112, 114 are separated. Therefore, the respective vent holes 118 are opened and the occupant is softly received even when the airbag cushion 100 is inflated when the occupant is positioned in front of the predetermined position to be seated, that is, at the out-of-position, and hence the occupant comes into contact with the right airbag section 112 and the left airbag section 114 in a relatively early stage from the start of inflation of the airbag cushion 100, for example.

In this embodiment, one each of the vent holes 118 is provided on the right airbag section 112 and the left airbag section 114, two each of the vent hole 118 may be provided. In this case, the lid member may be provided on every vent holes and, alternatively, there may be a vent hole having no lid member provided thereon, that is, there may be a vent hole which communicates the interior and the exterior of the right airbag section 112 and the left airbag section 114 constantly.

Figure 12:
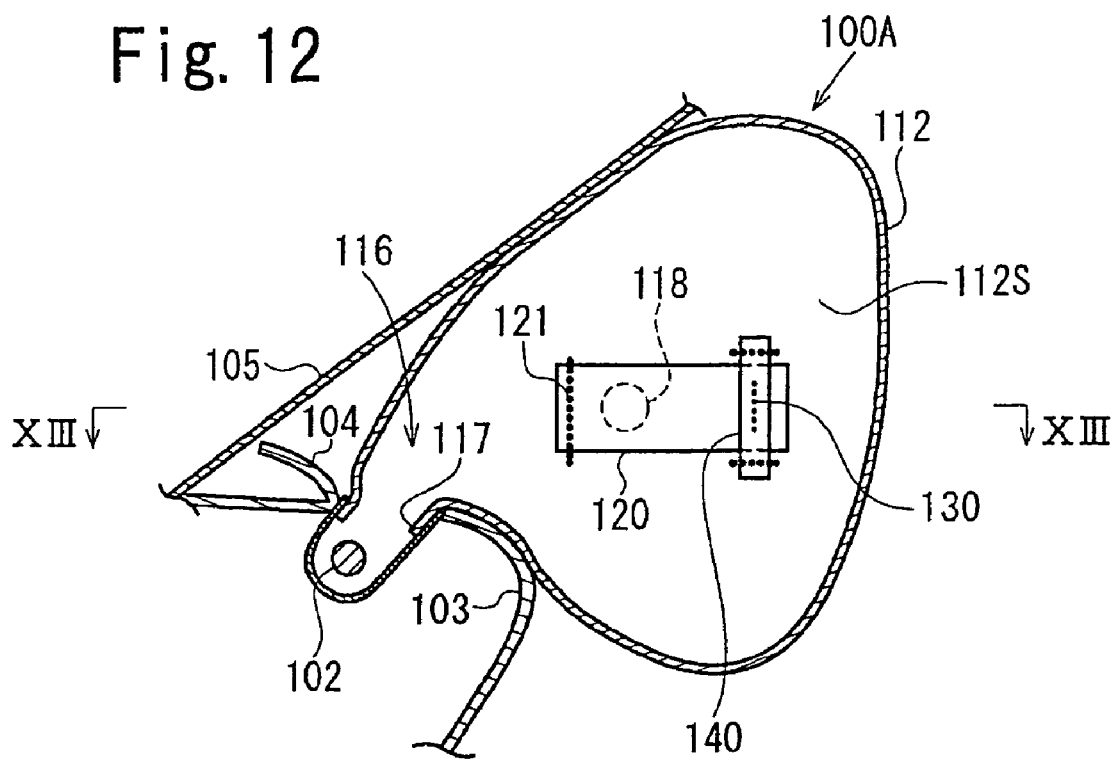
FIG. 12 is a vertical cross-sectional view of an airbag cushion and an airbag apparatus according to another embodiment.
Figure 13:
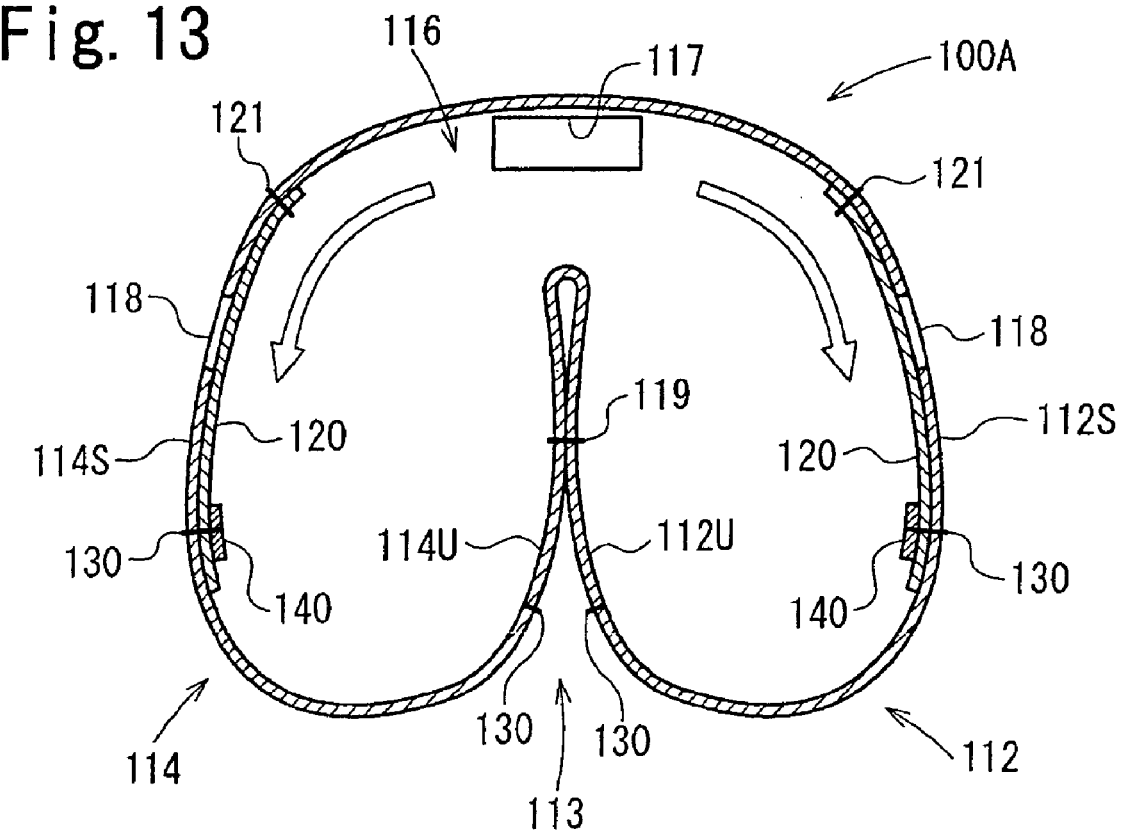
FIG. 13 is a horizontal cross-sectional view of the airbag cushion shown in FIG. 12 in an inflated state.
Figure 14:
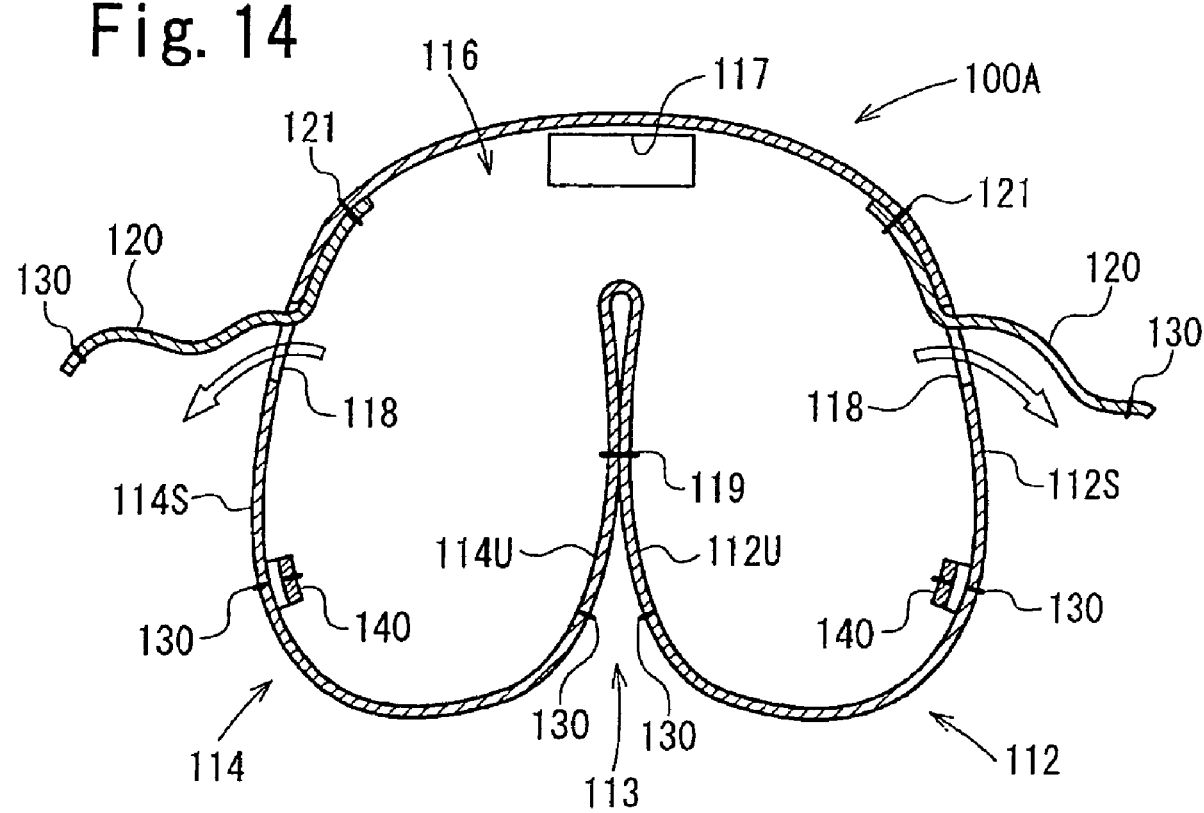
FIG. 14 is a horizontal cross-sectional view of the airbag cushion shown in FIG. 12 in an inflated state.

FIG. 12 is a cross-sectional view of an airbag cushion and an airbag apparatus according to another embodiment, FIGS. 13 and 14 are horizontal cross-sectional views when the airbag cushion is inflated, respectively, that is, taken along the line XIII-XIII in FIG. 12. FIG. 13 shows a stage before the lid members are pushed out from the airbag cushion after the tear seams are broken, and FIG. 14 shows a stage after the lid members are pushed out from the airbag cushion.

An passenger airbag cushion 100A in this embodiment has a configuration in which insertion portions 140 of the lid members 120 are provided at positions on the outside surfaces 112S, 114S of the bags 112, 114 on the opposite side from the proximal end chamber 116 with respect to the respective vent holes 118, that is, on the side of the occupant, and the distal end portions of the respective lid members 120 are inserted through the insertion portions 140 in the airbag cushion 100 shown in FIGS. 7 to 11 described above.

As shown in FIG. 12, in this embodiment, the insertion portions 140 are each formed of a small cloth in a substantially rectangular shape. A pair of two side portions of the rectangular small cloths are stitched to the respective outside surfaces 112S, 114S by seams (not designated by reference numerals). The distal end sides of the respective lid members 120 are slidably passed through pairs of remaining two sides of the small cloths between the small cloths and the respective outside surfaces 112S, 114S.

Other configurations of the airbag cushion 100A are the same as the embodiments shown in FIGS. 7 to 11 described above, and the same reference numerals in FIGS. 12 to 14 as in FIGS. 7 to 11 indicate the same parts. The operating mode of the airbag apparatus having the airbag cushion 100A is the same as the airbag apparatus shown in FIGS. 7 to 11.

In this embodiment, since the distal end portions of the lid members 120 are inserted through the insertion portions 140, respectively, the respective lid members 120 are prevented from being displaced from the respective vent holes 118 or from being curled up while the internal pressures of the respective airbag cushions 112, 114 are not increased to levels which cause the respective lid members 120 to be pushed out from the bags 112, 114 through the respective vent holes 118 after the respective tear seams 130 have broken and the joints between the distal end portions of the respective lid members 120 and the outside surfaces 112S, 114S and the inside surfaces 112U, 114U of the respective bags 112, 114 have released, so that the closability of the vent hole is improved.

The respective embodiments described above are only examples in the present invention, and the present invention is not limited to the respective embodiments described above.

For example, although not shown in a drawing, according to the present invention, a gas flow direction control member for controlling the ejected gas from the inflator to flow toward the lid member may be provided.

In the present invention, the lid member may have a configuration in which the airbag cushion partly covers the vent hole until the airbag cushion is inflated more than the predetermined extent and, when the airbag cushion is inflated by the predetermined extent or more, the vent hole is opened to a large extent.

In the respective embodiments described above, the vent hole has a circular opening. However, the shape of the vent hole is not limited thereto, and various shapes as the slit-like shapes or the like may be employed.

In the receptive embodiments described above, the tear seam formed by the sewing yarn which is broken when the interior of the airbag cushion reaches or exceeds the predetermined pressure is employed as the separable joint member which separably joins the distal end portions of the lid member and the airbag cushion. However, other separable joint members, for example, adhesive agent having a low-adhesive force may be employed. Also, in the present invention, since the distal end portions of the lid members and the airbag cushions may be joined by a low-strength adhesion so as to allow the separation when the interior of the airbag cushion reaches or exceeds the predetermined pressure.

The respective embodiments described above are examples of applications of the present invention to the airbag cushion and the airbag apparatus for the driver's seat and the passenger seat in the vehicle. However, the present invention may be applied to various airbag cushions and the airbag apparatuses other than those described above.

Incidentally, this application is based upon the benefit of priority from the prior Japanese Patent Application (Japanese Patent Application No. 2007-208220), filed on Aug. 9, 2007, the entire contents of which are incorporated herein by reference.

The invention claimed is:

1. An airbag cushion inflated by gas from an inflator comprising:
a vent hole;
a lid member arranged inside the airbag cushion for covering the vent hole,
wherein a proximal end portion of the lid member on the side of the inflator with respect to the vent hole is inseparably joined to the airbag cushion, and a distal end portion thereof on the opposite side from the inflator with the intermediary of the vent hole is separably joined to the airbag cushion by a separable joint member,
the joint by the separable joint member is released and the lid member is allowed to be pushed out from the airbag cushion through the vent hole when the interior of the airbag cushion reaches or exceeds a predetermined pressure, and
the separable joint member is provided only on an overlapped portion between the lid member and the airbag cushion.

2. The airbag cushion according to claim 1, wherein the distal end portion of the lid member is placed between opposed surfaces of the airbag cushion and the distal end portion and the opposed surfaces of the airbag cushion are joined by the separable joint member in a state in which the lid member covers the vent hole.

3. The airbag cushion according to claim 1, wherein the separable joint member is formed of a sewing yarn configured to be broken when the internal pressure of the airbag cushion reaches or exceeds the predetermined pressure.

4. The airbag cushion according to claim 3, wherein the sewing yarn is formed of a synthetic fiber yarn having a fineness of 420 to 1400 dtex.

5. The airbag cushion according to claim 3, wherein a suture pitch of the sewing yarn is from 4 to 8 mm.

6. The airbag cushion according to claim 3, wherein a seam of the sewing yarn extends in the direction intersecting the direction connecting the inflator and the vent hole, and
the length of extension of the seam is from 10 to 100 mm.

7. The airbag cushion according to claim 1, wherein the joint by the separable joint member is released in 10 to 30 milliseconds and the distal end portion of the lid member is separated from the airbag cushion from a moment when the inflator is activated.

8. The airbag cushion according to claim 1, where an insertion portion of the lid member is provided on an inner side surface of the airbag cushion on the opposite side from the inflator with the intermediary of the vent hole, and
the distal end portion of the lid member is inserted into the insertion portion.

9. The airbag cushion according to claim 1, wherein
the airbag cushion includes:
a right airbag section configured to be inflated on the right side in front of an occupant;
a left airbag section configured to be inflated on the left side in front of the occupant; and
a proximal end chamber configured to communicate proximal end sides of the right airbag section and the left airbag section with each other,
the proximal end chamber is configured to allow gas from the inflator to be introduced therein;
an outside surface of the right airbag section on the side opposite from the left airbag section and an outside surface of the left airbag section on the side opposite from the right airbag section are respectively provided with the vent holes which respectively communicates the interior and the exterior of the airbag cushion,
the vent holes are covered by the lid members respectively from the inside of the right airbag section and the inside of the left airbag section, and
in the right airbag section and the left airbag section, respectively, proximal end portions of the lid members on the side of the proximal end chamber with respect to the vent holes are inseparably joined to the outside surfaces, and distal end portions thereof on the opposite sides from the proximal end chamber with the intermediary of the vent holes are separably joined to the outside surface by the separable joint members.

10. The airbag cushion according to claim 9, wherein in the right airbag section, the distal end portion of the lid member is placed between the outside surface of the right airbag section and an inside surface of the right airbag section on the side of the left airbag section, and the distal end portion and the outside surface and the inside surface are joined by the separable joint member in a state in which the lid member covers the vent hole, and in the left airbag section, the distal end portion of the lid member is placed between the outside surface of the left airbag section and an inside surface of the left airbag section on the side of the right airbag section, and the distal end portion and the outside surface and the inside surface are joined by the separable joint member in a state in which the lid member covers the vent hole.

11. An airbag apparatus comprising an airbag cushion according to claim 1 and an inflator configured to supply gas to the airbag cushion.

12. The airbag apparatus according to claim 11, wherein the inflator is installed so as to eject gas toward the vent hole.

* * * * *